United States Patent
Banal et al.

(10) Patent No.: US 6,638,692 B1
(45) Date of Patent: Oct. 28, 2003

(54) REPLICATED REGIONS ON OPTICAL DISKS

(75) Inventors: Anthony O. Banal, Fergus Falls, MN (US); Ted L. Bahns, White Bear Lake, MN (US); Kristi L. Chavez, Wahpeton, ND (US); Donald J. Kerfeld, St. Paul, MN (US); Chad R. Sandstrom, Stillwater, MN (US)

(73) Assignee: Imation Corp., Oakdale, MN (US)

( * ) Notice: Subject to any disclaimer, the term of this patent is extended or adjusted under 35 U.S.C. 154(b) by 89 days.

(21) Appl. No.: 09/906,357

(22) Filed: Jul. 16, 2001

(51) Int. Cl.[7] .................................................. G11B 7/26
(52) U.S. Cl. ....................... 430/320; 430/321; 430/945; 264/2.5; 264/153; 264/157
(58) Field of Search .................... 430/320, 321, 430/945; 264/1.1, 1.33, 1.36, 1.37, 2.5, 153, 157

(56) References Cited

U.S. PATENT DOCUMENTS

| | | |
|---|---|---|
| 3,565,978 A | 2/1971 | Folger et al. |
| 4,296,158 A | 10/1981 | Lewis |
| 4,298,158 A | 11/1981 | Hoppe et al. |
| 4,302,411 A | 11/1981 | Nakagawa et al. |
| 4,374,077 A | 2/1983 | Kerfeld |
| 4,391,579 A | 7/1983 | Morrison |
| 4,726,006 A | 2/1988 | Benne et al. |
| 4,729,938 A | 3/1988 | Tajima et al. |
| 4,845,000 A | 7/1989 | Takeoka et al. |
| 5,149,607 A | 9/1992 | De Graaf et al. |
| 5,174,937 A | 12/1992 | Tamura et al. |
| 5,458,985 A | 10/1995 | Isono et al. |
| 5,489,410 A | 2/1996 | Baumgartner et al. |
| 5,586,109 A | 12/1996 | Inui et al. |
| 5,597,613 A | 1/1997 | Galarneau et al. |
| 5,729,906 A | 3/1998 | Banks et al. |
| 5,783,371 A | 7/1998 | Bifano |
| 5,792,492 A | 8/1998 | Takahashi |
| 6,190,838 B1 | 2/2001 | Kerfeld |

FOREIGN PATENT DOCUMENTS

| | | | |
|---|---|---|---|
| EP | 0 355 925 A | * | 2/1990 |
| EP | 0 358 276 | | 3/1990 |
| FR | 2 676 577 | | 11/1992 |
| JP | 57-172553 | | 10/1982 |
| JP | 59-114031 | | 6/1984 |
| JP | 62-95749 | | 5/1987 |
| JP | 1-301880 | | 12/1989 |
| JP | 3-37842 | | 2/1991 |

(List continued on next page.)

OTHER PUBLICATIONS

Dill, F. et al., "Characterization of Positive Photoresist," *IEEE Transactions on Electron Devices*, ED–22, No. 7, pp. 445–452 (Jul. 1975).

Trefonas, P., et al., "New Principle for Image Enhancement in Single Layer Positive Photoresists," Proc. for SPIE, 771, pp. 194–210 (Mar. 1987).

Horigome et al, "Novel stamper process for optical disc," Optical Storage Technology and Applications, Proceedings of SPIE–The International Society for Optical Engineering, Los Angeles, CA, Jan. 12–15, 1998, vol. 899, XP 000010872, pp. 123–128.

(List continued on next page.)

*Primary Examiner*—John A. McPherson
(74) *Attorney, Agent, or Firm*—Eric D. Levinson

(57) ABSTRACT

The invention is directed toward techniques for stamping optical data storage disks. A master is first created to include several distinct information regions etched upon a master surface. The master is then used to create one or more stampers. The stampers include a number of distinct stamper regions in locations corresponding to locations of the distinct information regions on the master. The stamper is then used to create a number of first replica disks that include distinct replicated regions. The distinct replicated regions are removed from the first replica disks to define second disks.

13 Claims, 13 Drawing Sheets

FOREIGN PATENT DOCUMENTS

| | | | |
|---|---|---|---|
| JP | 7-014218 A | * | 1/1995 |
| JP | 7-320305 A | * | 12/1995 |
| JP | 9-097452 | | 4/1997 |
| JP | 9-138981 | | 5/1997 |
| WO | WO 97/12279 | | 4/1997 |
| WO | WO 99/52105 | | 10/1999 |

OTHER PUBLICATIONS

Nakamura, Shigeru et al., "High Density Recording for Magneto–optical Disk Drive," *IEEE Transactions on Magnetics*, 34, No. 2, pp. 411–413 (Mar. 1998).

* cited by examiner

REPLICATED REGIONS ON OPTICAL DISKS

TECHNICAL FIELD

The invention relates to the manufacture of optical data storage disks.

BACKGROUND OF THE INVENTION

Optical data storage disks have gained widespread acceptance for the storage, distribution and retrieval of large volumes of information. Optical data storage disks include, for example, audio CD (compact disc), CD-R (CD-recordable), CD-ROM (CD-read only memory), DVD (digital versatile disk or digital video disk) media, DVD-RAM (DVD-random access memory), and various types of rewritable media, such as magneto-optical (MO) disks and phase change optical disks. Some newer formats for optical data storage disks are progressing toward smaller disk sizes and increased data storage density.

Optical data storage disks can be produced by first making a master disk that has a surface pattern that represents encoded data on the master disk surface. The surface pattern, for instance, may be a collection of grooves that define master pits and master lands. The master disk is typically created by a relatively expensive mastering process.

After creating a suitable master, that master can then be used to make a stamper. The stamper has a surface pattern that is the inverse of the surface pattern encoded on the master. The stamper, then, can be used to stamp large quantities of replica disks in a mass production stamping process such as an injection molding process or a rolling bead process. Each replica disk may contain the data and tracking information that was encoded on the master.

During a stamping process, an inverse of the surface pattern on the stamper becomes molded into each replica disk, forming a collection of grooves that define lower reflectance "pits" within a plane of higher reflectance "lands." Typically, the stamped side of the disk is then coated with a reflectance layer, such as a thin layer of aluminum, and in the case of a CD, followed by a protective layer of lacquer. Data tracks on an optical disk can be arranged in a spiral manner originating at the disk center and ending at the disk outer edge, or alternatively, a spiral track can originate at the disk outer edge and end at the disk center. The data also can lie in a series of concentric tracks spaced radially from the disk center.

SUMMARY

In general, the invention is directed toward techniques for stamping optical data storage disks. A master is first created to include several distinct information regions etched upon a master surface. The master is then used to create one or more stampers. The stampers include a number of distinct stamper regions in locations corresponding to locations of the distinct information regions on the master. The distinct information regions may be substantially circular in shape. The stamper may then be used to create additional stampers, or ultimately, to create a number of first replica disks.

A first replica disk includes distinct replicated regions in locations substantially corresponding to locations of the distinct information regions on the master. These distinct replicated regions can then be separated from the first replica disk to create a number of second replica disks that are smaller than the first disk. For example, the replicated regions may be separated from the first disk by die punching, laser cutting or mechanical cutting, i.e., using a lathe or carbide cutting tool. Other ways of separating the replicated regions could also be used. The final result is a number of second replica disks having sizes that substantially correspond to the sizes of the distinct information regions that were originally etched upon the master surface. Thus, a single replica disk can be stamped and then subdivided into multiple replica disks.

In one embodiment, a method includes creating a master having distinct information regions etched upon a surface, and creating a stamper from the master. The distinct information regions may be etched upon the surface of the master in an evenly spaced arrangement, wherein the distance between the center of the master and the centers of the distinct information regions are substantially equal. The method may also include stamping a first disk with the stamper, the first disk including replicated regions in locations substantially corresponding to locations of the distinct information regions on the master. In addition, the method may include separating the replicated regions from the first disk to create a number of second disks from the first disk.

Creating the master may include coating a master glass with photoresist and placing the master glass in a master glass carrier such that the center of the master glass is offset from the center of the master glass carrier. A first distinct information region can then be exposed to a laser on the master glass. The master glass is then rotated relative to the master glass carrier, and a second distinct information region can then be exposed. After exposing a number of information regions, the master glass can be developed to define the information regions on the master glass.

In other embodiments, the invention comprises masters, stampers, or optical disks. For example, a master may include multiple distinct information regions etched upon a surface in an evenly spaced arrangement, wherein distances between a center of the master and centers of the information regions are substantially equal. A stamper may include a number of distinct stamper regions in an evenly spaced arrangement, wherein the distance between the center of the stamper and the centers of the distinct stamper regions are substantially equal. Similarly, an optical disk may include a number of distinct replicated regions in an evenly spaced arrangement, wherein a distance between a center of the optical disk and centers of the replicated regions are substantially equal.

The invention provides several advantages. For example, the invention can generally promote more efficient optical disk manufacturing. In particular, a single stamping process can yield a number of replica disks. Smaller disks are simply die punched or otherwise removed from a stamped disk that includes a number of distinct replicated regions. In addition, the invention can utilize many existing machines and processes to fabricate newer optical disks that are sized much smaller than the disks that existing machines were originally designed to create. For example, conventional CD or DVD stamping tools can be utilized to stamp the first disks. A number of smaller disks can then be removed from each first disk. Utilizing existing stamping tools can significantly reduce overhead associated with the development of smaller optical disks for use with new formats.

In addition, the invention may realize optical disks that have improved characteristics. In particular, center holes in the smaller optical disks can be punched after a reflective layer is deposited on the smaller disks. This can avoid the accumulation of metal in the center holes of the disk, which may occur if a conventional process is used to create the smaller disks. The accumulation of metal in the center hole of a disk is undesirable if a hub is to be attached to the center hole, e.g., which is often the case for formats in which the smaller disks are ultimately housed in a data cartridge.

Removing a number of smaller disks from a first disk that includes a number of replicated regions can also improve disk quality of the smaller disks. For example, the smaller disks may not exhibit disk imperfections or thickness variations typically associated with edges of molded disks. In addition, overexposure of photoresist on the master can be avoided in the case where the innermost regions of the smaller disks are exposed to a laser. In particular, laser reflection off of a center hub, which can overexpose the photoresist, can be avoided if the replicated regions are located at a distance from the center of the master.

Additional details of these and other embodiments are set forth in the accompanying drawings and the description below. Other features, objects and advantages will become apparent from the description and drawings, and from the claims.

DETAILED DESCRIPTION

Figure 1:
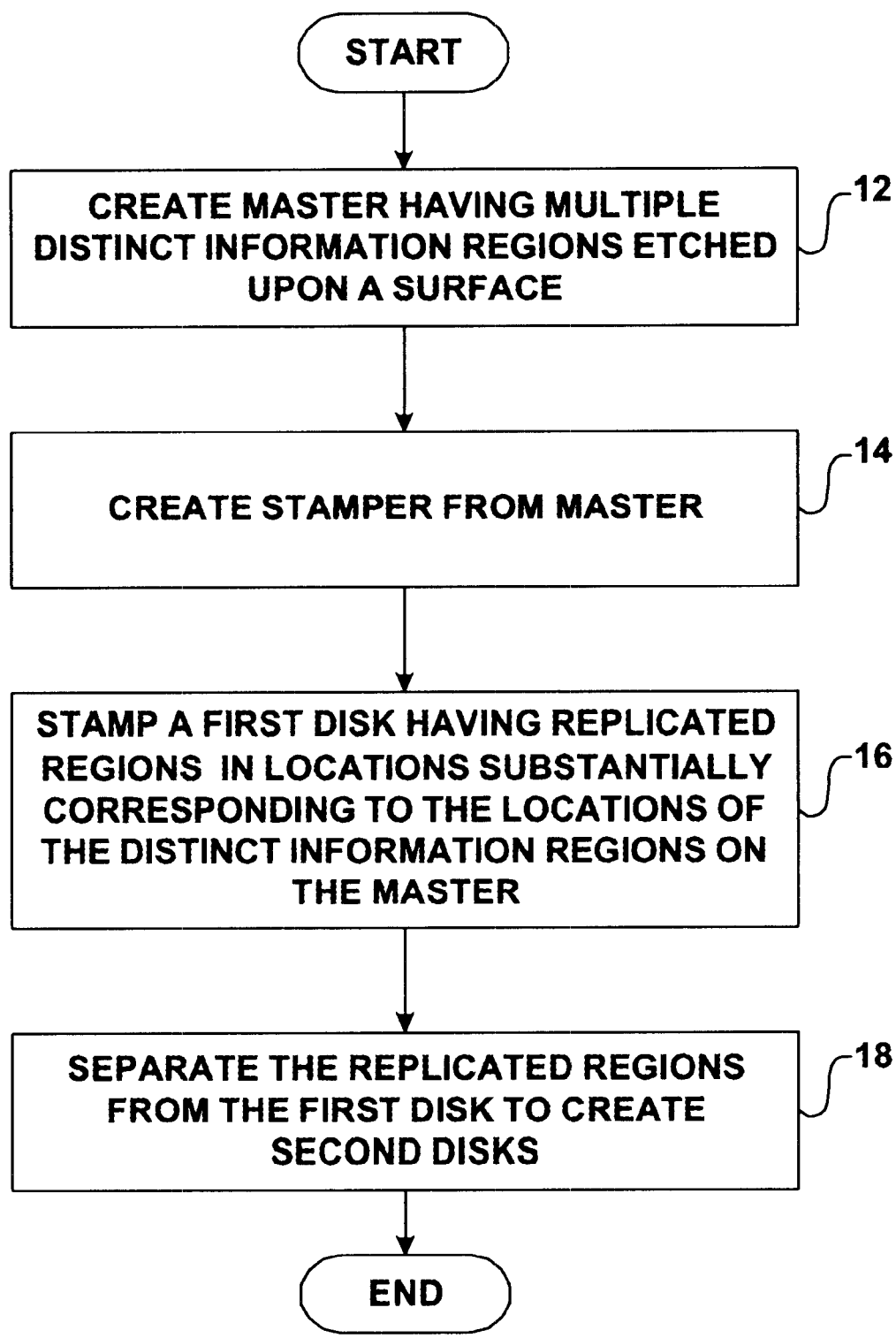
FIG. 1 is a flow diagram according to an embodiment of the invention.

FIG. 1 is a flow diagram according to an embodiment of the invention. As shown, a master is created having multiple distinct information regions etched upon a surface of the master (12). The distinct information regions ultimately correspond respectively to individual replica disks that will be created by the process, i.e., the second disks. Accordingly, the distinct information regions may be substantially circular in shape. The distinct information regions may be substantially identical to each other in terms of the information encoded in those regions. However, the invention is not limited in that respect. The process of creating the master is described in greater detail below.

After creating a master (12), a stamper is created from the master (14). Indeed, in some cases, multiple stampers can be created from a single master. However, often the process of creating a stamper from the master is destructive to the master, and therefore only a single stamper may be created from a master in some cases. Processes of creating metal stampers and plastic stampers from the master are described in greater detail below. Similar processes could also be used to create second generation stampers from the first generation stamper, third generation stampers from the second generation stampers, and so forth.

After creating the stamper (14), it can be used to stamp a first replica disk (16). The first replica disk includes replicated regions substantially corresponding to the distinct information regions of the master. In other words, the distinct information regions on the master are transferred to the stamper to define stamper regions, which have patterns that are the inverse of those on the master. The stamper regions are then transferred to the first replica disk, defining the replicated regions on the first replica disk.

The replicated regions can then be separated form the first disk to create second disks (18). In other words, the first disk is subdivided into a set of second disks. For example, the first disk can be die punched to create the second disks. Alternatively, a laser cutting tool, or a mechanical cutting tool such as a lathe or a carbide cutting tool could be used. Other methods of separating the replicated regions from the first disk could also be used. Importantly, however, the replicated regions define the second disks.

A reflective layer may then be added to the second disks and center holes can be punched or cut from the second disks. Alternatively, the reflective layer may be added prior to removing the second disks from the first disk. The second disks may be used as information storing disks, or alternatively, the second disks may be inserted into a cartridge, or the like, for use as a data storage cartridge. In either case, the disk typically will be rotated within an optical disk drive to access data stored on the disk. In the case of a data storage cartridge, a hub may be attached to the second disks where the center hole was punched. Indeed, punching the center holes after depositing the reflective layer can improve bonding between a hub and the second disks. In particular, bonding material may adhere better to the inner edges of a center punched second disk if metal is not deposited on the edge.

Separating the replicated regions from a first disk to create second disks (18) provides advantages in terms of disk quality. In particular, imperfections at the disk edges can be avoided. Molded disks often exhibit imperfections or thickness variations at inner and outer edges of the disk. Separating the replicated regions from a first disk to create the second disks (18), however, can yield second disks that have edges that do not correspond to the edges of the first disk. Instead, the outer diameters of the second disks reside within the interior of the first disk. In this manner, edge imperfections in the second disks can be avoided. The replicated regions may be optically detected prior to separation from the first disk to ensure that the regions of the first disk that are separated correspond to the replicated regions.

The process of FIG. 1 can generally promote more efficient optical disk manufacturing. In particular, a single stamping process (16) can yield a number of replica disks. Second disks are simply separated from the first disk (18). The invention can utilize many existing machines and processes to fabricate newer optical disks that are sized much smaller than the disks that existing machines were originally designed to create. For example, conventional CD or DVD stamping tools can be utilized to stamp the first disks. A number of smaller disks can then be removed from each first disk. Utilizing existing stamping tools can significantly reduce overhead associated with the development of smaller optical disks for use with new formats.

One particular format requires optical data storage disks having diameters of approximately 32 millimeters. In that case, the distinct information regions on the master may have diameters of approximately 32 millimeters. Similarly, distinct stamper regions on the stamper may have diameters of approximately 32 millimeters. The first disks may be 120 millimeter disks or 130 millimeter disks, for example, corresponding to conventionally sized optical data storage disks. Replicated regions on the first disks may have diameters of approximately 32 millimeters. These replicated regions may be separated from the first disks to define second disks having diameters of approximately 32 millimeters. Thus, a single 120-millimeter or 130-millimeter disk can yield a number of 32 millimeter disks. Of course, the invention could be easily modified to create optical data storage disks having any particular size.

Figure 2:
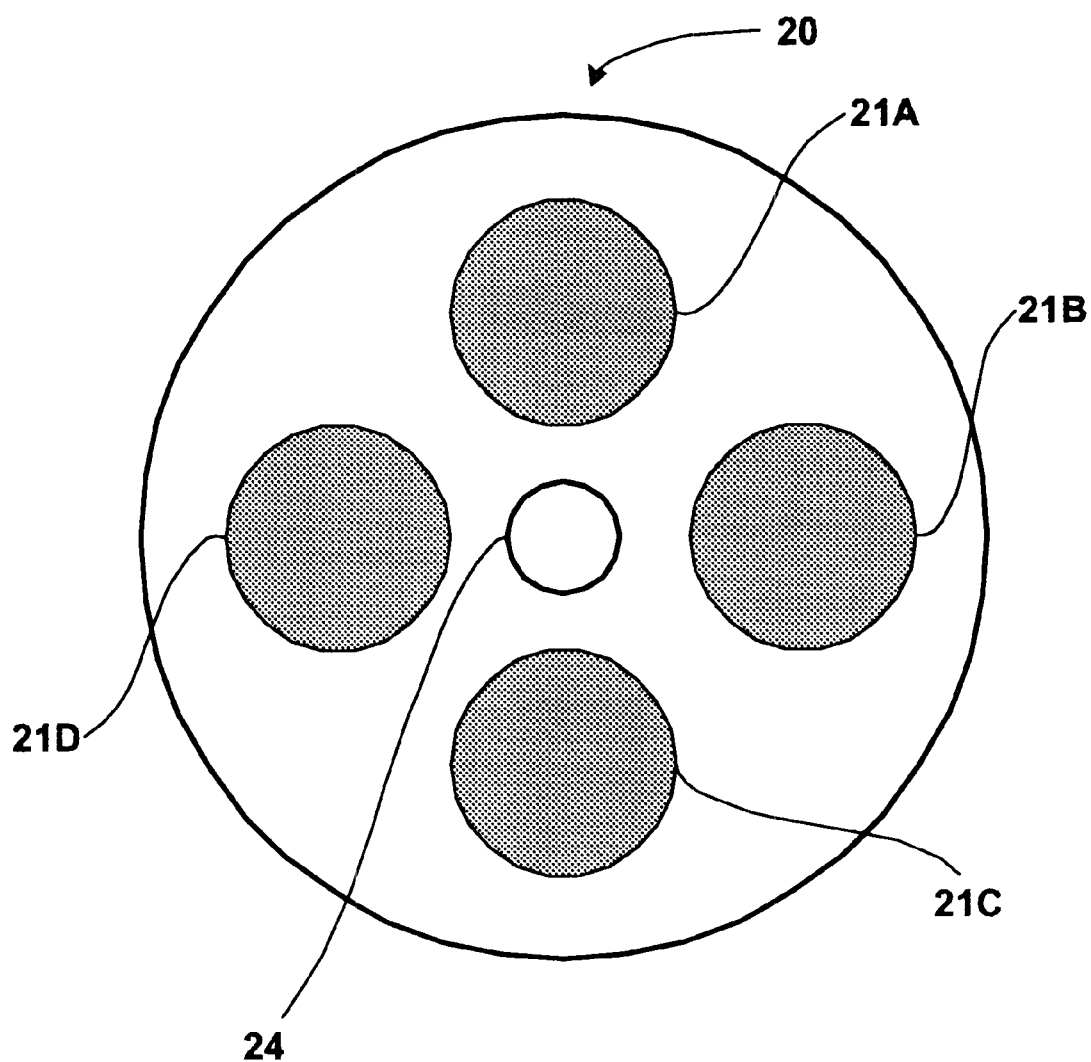
FIG. 2 is a top view of a replica disk according to the invention.

FIG. 2 is a top view of a replica disk 20 according to the invention, i.e., a first disk. Replica disk 20 includes a number of distinct replicated regions 21A–21D. These replicated regions may reside on replica disk 20 in an evenly spaced arrangement such that a distance between a center of replica disk 20 and the centers of the replicated regions 21A–21D are substantially equal. The evenly spaced arrangement may result from a mastering process described below. Again, the master is used to create a stamper, which is in turn used to create replica disk 20. The distinct replicated regions 21A–21D can then be removed from replica disk 20, creating several second disks. Replica disk 20 may also include a center hole 24, although the invention is not limited in that respect.

Although FIG. 2 is illustrated as including four replicated regions 21A–21D, any number of replicated regions could be included. The number of replicated regions that are included on replica disk 20 may be a function of the size of the replicated regions relative to replica disk 20. For example, if replica disk 20 is made larger and/or the replicated regions 21A–21D are made smaller, the number of replicated regions that could be included within replica disk 20 may increase. The number of replicated regions could also be limited by the manner in which the replicated regions 21A–21D are to be removed from replica disk 20. For example, if a die punch is used to separate the replicated regions from replica disk 20, replica disk 20 may require more area between the replicated regions 21A–21D. Thus, the number of replicated regions that are included on replica disk 20 may be limited by the amount of area required between the replicated regions 21 A–21D.

Figure 3:
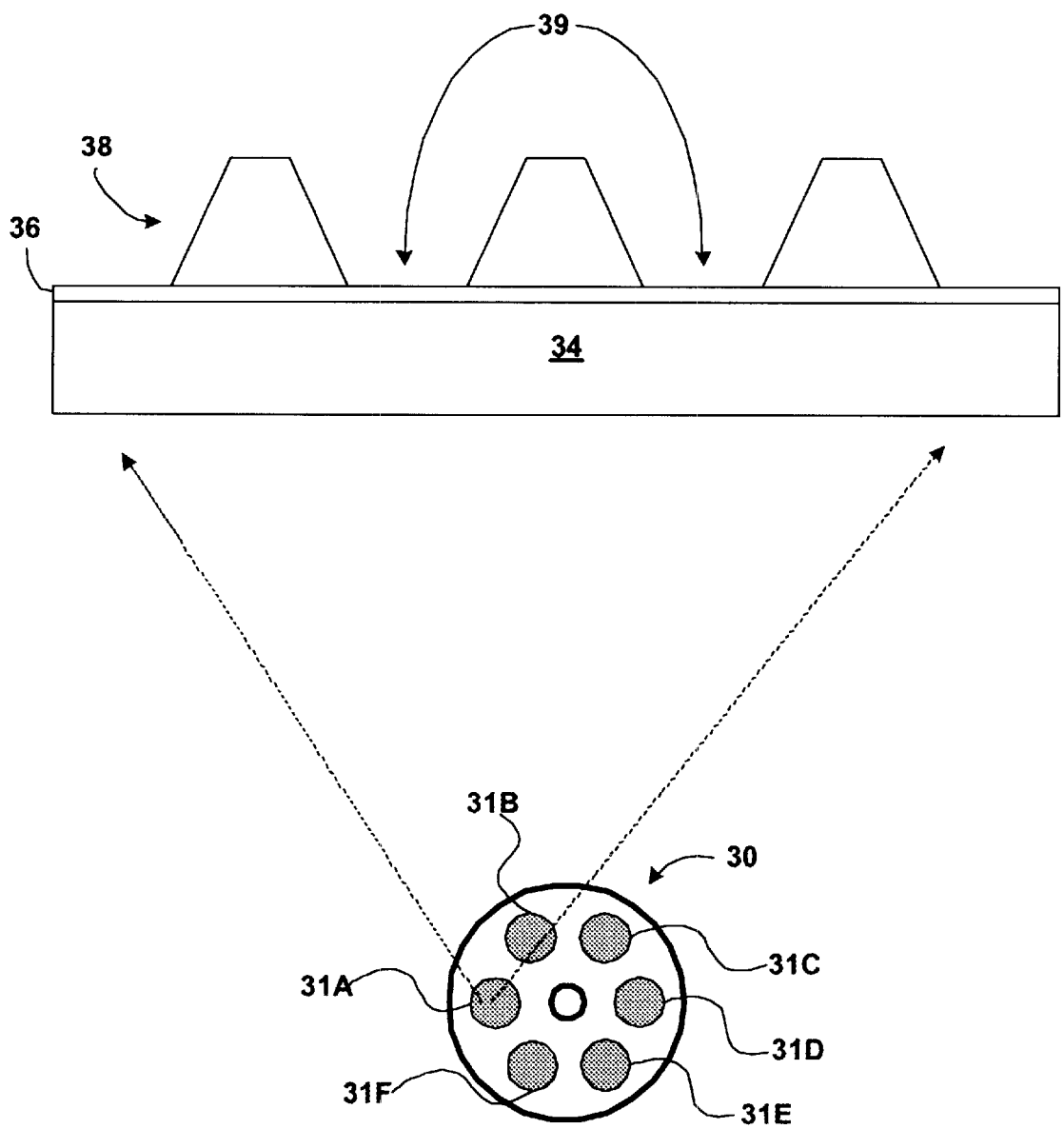
FIG. 3 is a top view of a master disk according to the invention, and an enlarged cross-sectional view of a small portion of an information region of the master disk.

FIG. 3 shows an exemplary master disk 30. Master disk 30 may include a number of distinct information regions 31A–31F. Again, any number of distinct information regions could be included. The distinct information regions 31A–31F reside on master disk 30 in an evenly spaced arrangement such that: a distance between a center of master disk 30 and the centers of the information regions 31A–31F are substantially equal. For illustrative purposes, an enlarged cross sectional view of a small portion 34 of a information region 31 A is also shown.

The information regions 31A–31F can each be formed, e.g., by spin coating a layer of photoresist 38 onto a bonding layer 36. The thickness of the photoresist layer 38, e.g., 20–200 nanometers, can be varied according to the spin speed and the photoresist solution. After spin coating a layer of photoresist 38 onto the bonding layer 36, the master 30 can then be placed on a laser beam recorder, e.g., a laser beam exposure table. The laser can then be shuttered on and off, or modulated, as the master disk is spun at a desired speed to expose the layer of photoresist 38 to the laser beam. The on and off shuttering of the laser beam can be made representative of the data to be encoded on the respective information layer 31, for instance, forming the desired grooves 39 on master 30.

After exposing master disk 30 to the laser, master disk 30 may undergo a development process. For example, sodium hydroxide and water can be dispersed across master disk 30 as it rotates, and the layer of photoresist 38 is etched away by the solution in the areas where the layer of photoresist 38 was exposed to the laser beam. In this manner, the desired pattern of grooves can be encoded on master disk 30 in the information regions.

To increase the durability of master disk 30, it may be passed through a baking process after the development process. Baking master disk 30, for instance, may strengthen cross-linking of the layer of photoresist 38, improving and increasing the bond strength of the photoresist layer 38 to bonding layer 36. By way of example, a baking time of approximately one hour at 100 degrees Centigrade may be suitable, although the actual temperature and bake time may vary according to the type of photoresist that is used.

After developing and baking master disk 30, master disk 30 may be coated with a relatively thin layer, e.g., 20 nanometers, of a metal such as nickel or chromium (not shown in FIG. 3). The relatively thin metal layer can serve at least two purposes. First, it can provide a high quality reflecting surface for optical inspection of the disk quality and defects. And second, it can act as a barrier so that multiple plastic first generation stampers can be created from master disk 30 without it being destructive to the recorded master disk 30.

Figure 4:
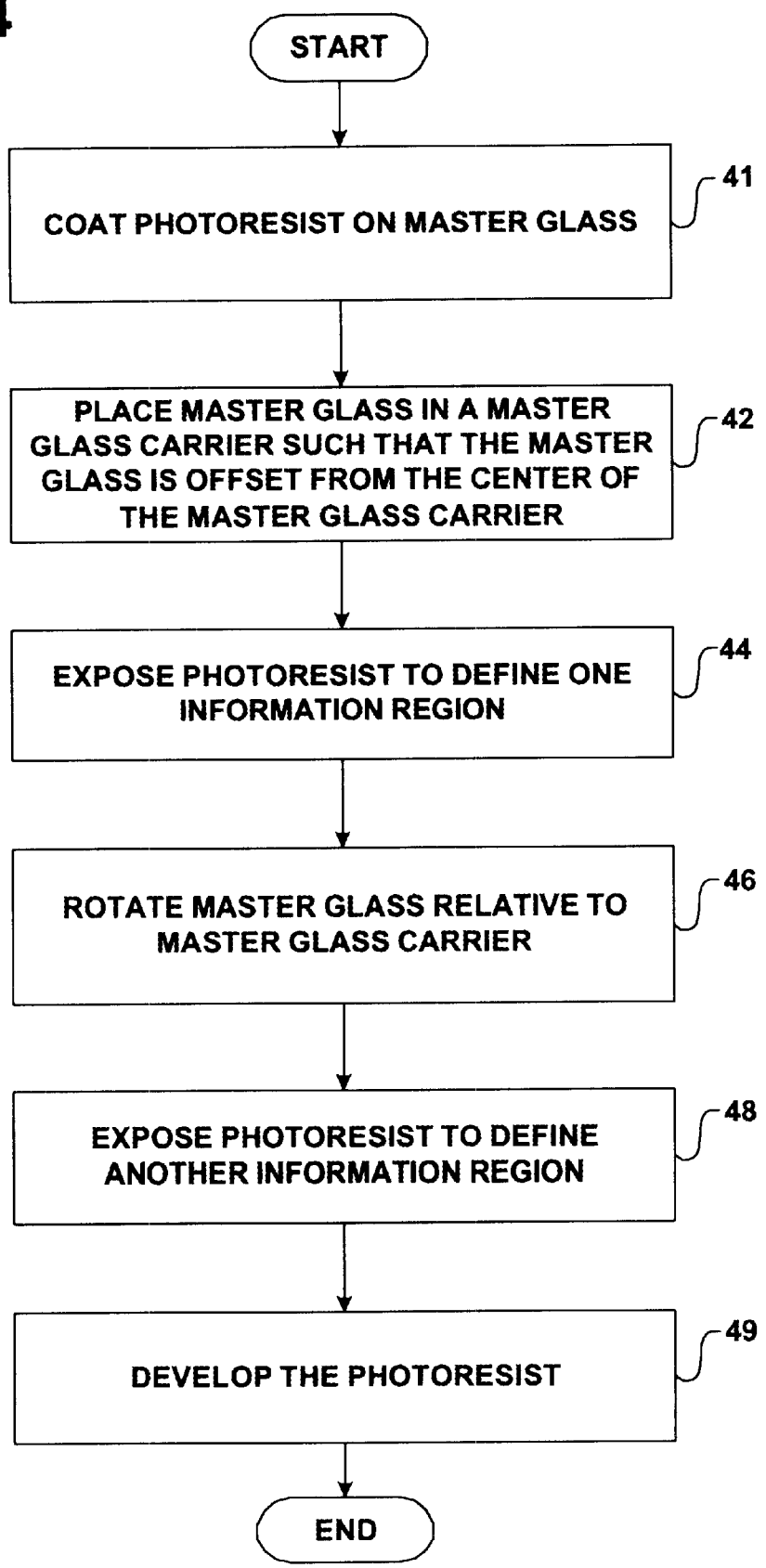
FIG. 4 is a flow diagram illustrating a mastering process according to the invention.
Figure 5:
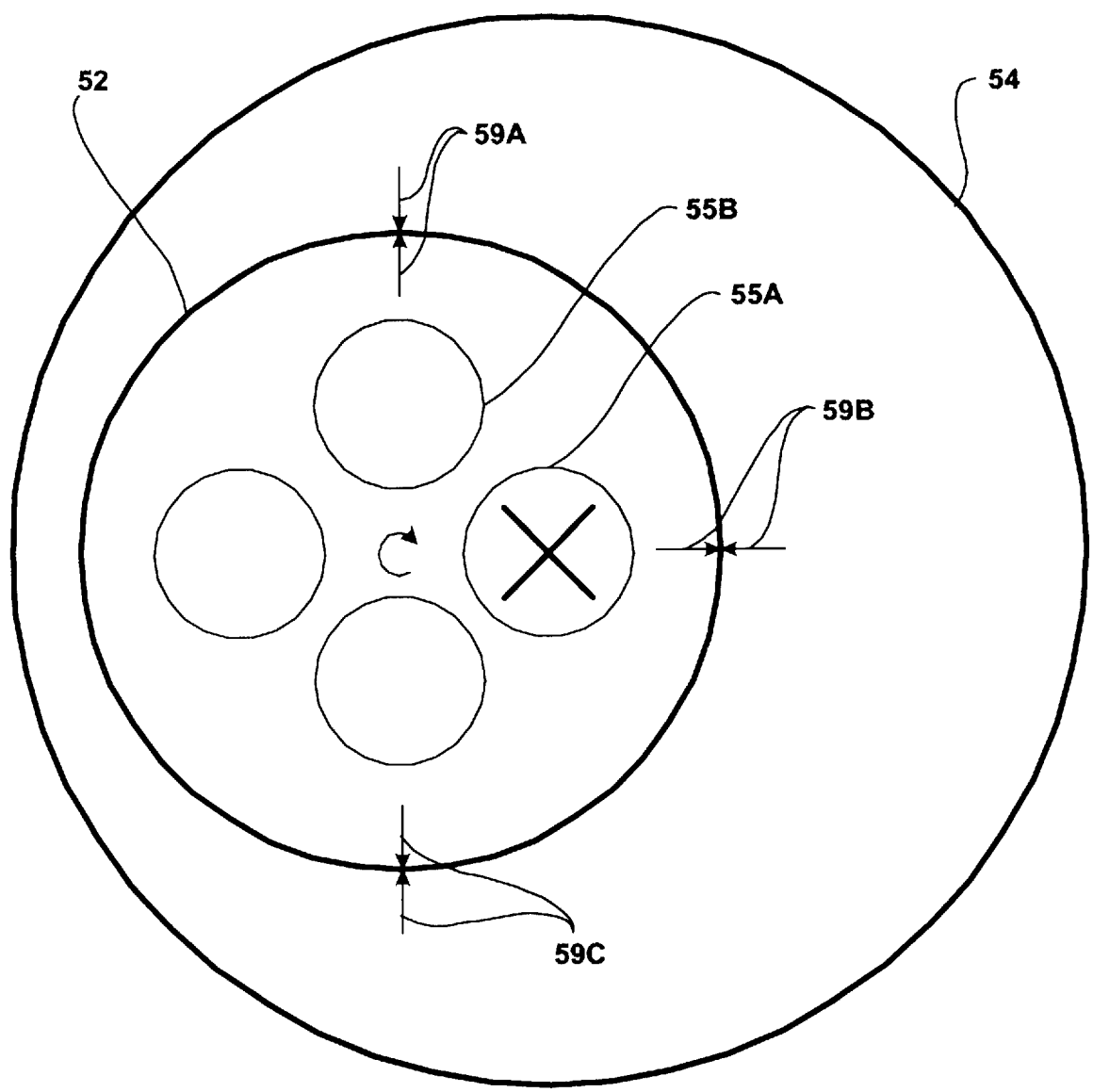
FIGS. 5–6 are top views of example mastering systems according to the invention.

FIG. 4 is a flow diagram illustrating in greater detail a mastering process according to the invention. FIG. 5 illustrates a mastering system for implementing the process of FIG. 4. The process can be used to create circular shaped information regions 31A–31F (FIG. 3) on master disk 30 in an evenly spaced arrangement such that a distance between a center of master disk 30 and the centers of the information regions 31A–31F are substantially equal. As shown, a layer of photoresist is coated on a master glass 52 (FIG. 5) (41). The master glass 52 is placed in master glass carrier 54 such that master glass 52 is offset from the center of master glass carrier 54 (42). The center of an information region 55A may correspond to the center of master glass carrier 54 (indicated by the X). The photoresist can then be exposed (44) as described above to define that information region 55A. Master glass 52 is then rotated relative to master glass carrier 54 (46), and the photoresist is exposed again (48) to define the second information region 55B.

In other words, the region corresponding to a first information region 55A is aligned with the center of master glass carrier 54 and exposed (44) by spinning master glass carrier 54 and shuttering or modulating a laser on the first information region 55A. Master glass 52 is then rotated relative to master glass carrier 54 (46), such that the region corresponding to a second information region 55B is positioned in the center of the master glass carrier 54. The photoresist is then exposed (48) to define that second information region 55B. Master glass 52 can then be rotated again and again, repeating the exposing process to define each distinct information layer. Master glass 52 is then removed from master glass carrier 54 and the photoresist is developed (49).

Master glass 52 and master glass carrier 54 may include position marks 59A–59C to ensure that a given information region is properly positioned at the center of the master glass carrier 54. Master glass carrier 54 may include a recess for receiving master glass 52. In other words, master glass carrier 54 may include a recess corresponding to the shape of master glass 52, the recess being offset from the center of master glass carrier 54.

Figure 6:
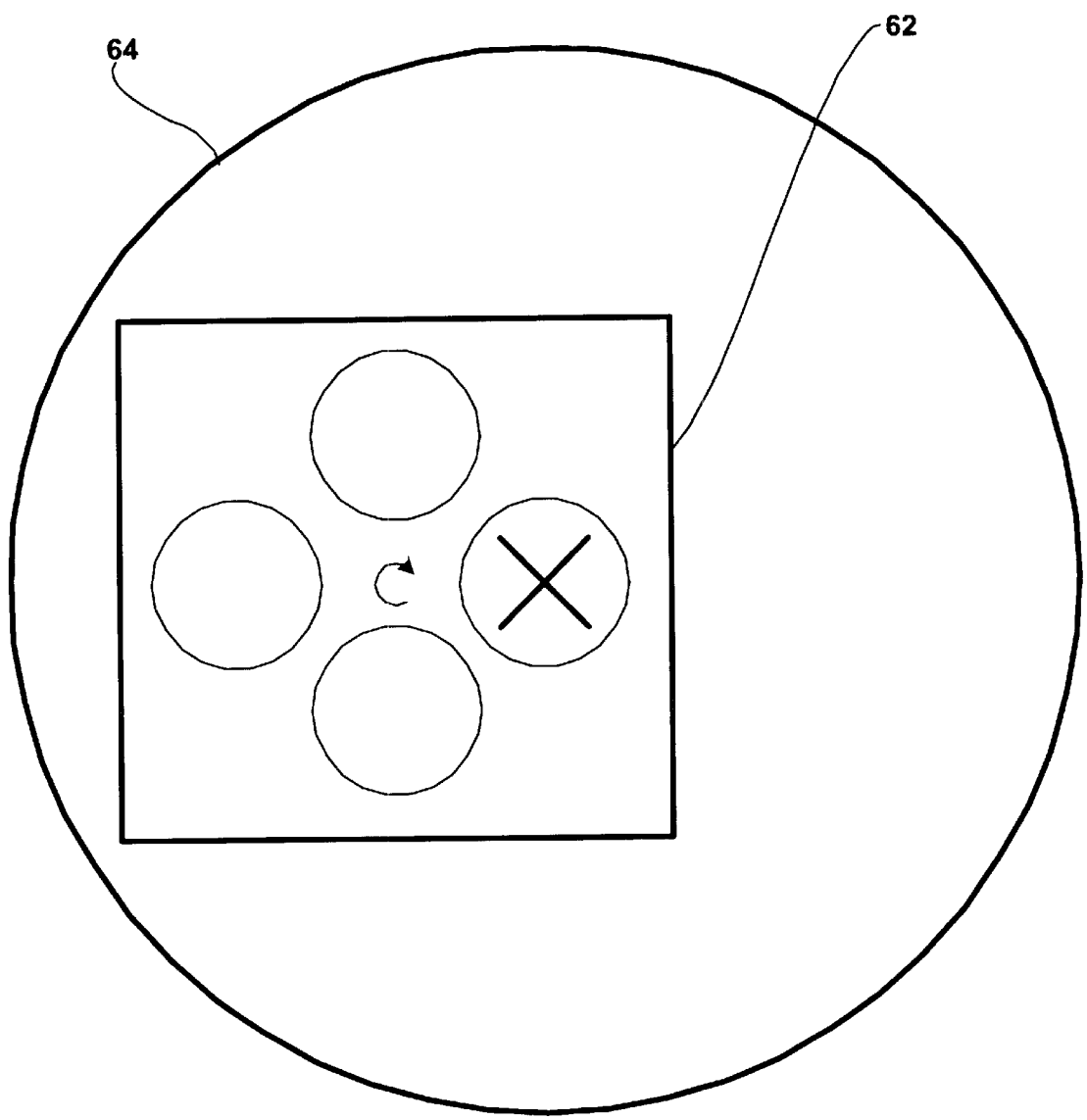

FIG. 6 illustrates another mastering system for implementation of the process of FIG. 4. In particular, FIG. 6 illustrates a square shaped master glass 62. In this case rotating master glass 62 (46) may comprise lifting master glass 62 from master glass carrier 64, turning master glass 62 a quarter turn relative to master glass carrier 64 and placing master glass 62 back in master glass carrier 64. Shaping the master glass according to a multi-sided geometric shape, e.g., a triangle, a square, a pentagon, a hexagon, an octagon etc., can be advantageous. Each distinct information region may correspond to a side of the geometric shape of master glass 62. In other words, a square shaped master glass may include four distinct information regions and an octagonal shaped master glass may include eight distinct information regions. Positioning marks 59A–59C (FIG. 5) would not be needed. A recess in the master glass carrier could correspond to the shape of the master glass. The different orientations in which the master glass could be inserted into the recess in the master glass carrier would conveniently place information regions at the center of the master glass carrier.

The mastering systems of FIGS. 5 or 6 provide several advantages over conventional mastering systems. For example, the systems of FIGS. 5 or 6 allow for circular shaped information regions to be created on a master disk in an evenly spaced arrangement such that a distance between a center of master disk and the centers of the information regions are substantially equal. Moreover, by exposing photoresist to define information regions at locations that do not correspond to the center of the master disk, overexposure of the photoresist can be avoided. In particular, laser reflection off of a center hub of the master disk, which can overexpose the photoresist, can be avoided if the information regions are located in regions a distance from the center of the master. As disk formats decrease in size, it becomes more desirable to store information closer to the center of the disks. Conventional mastering techniques, however, can be plagued with the overexposure problems addressed above, especially as information is etched closer to the center of the master. The invention overcomes these overexposure problems.

Figure 7:
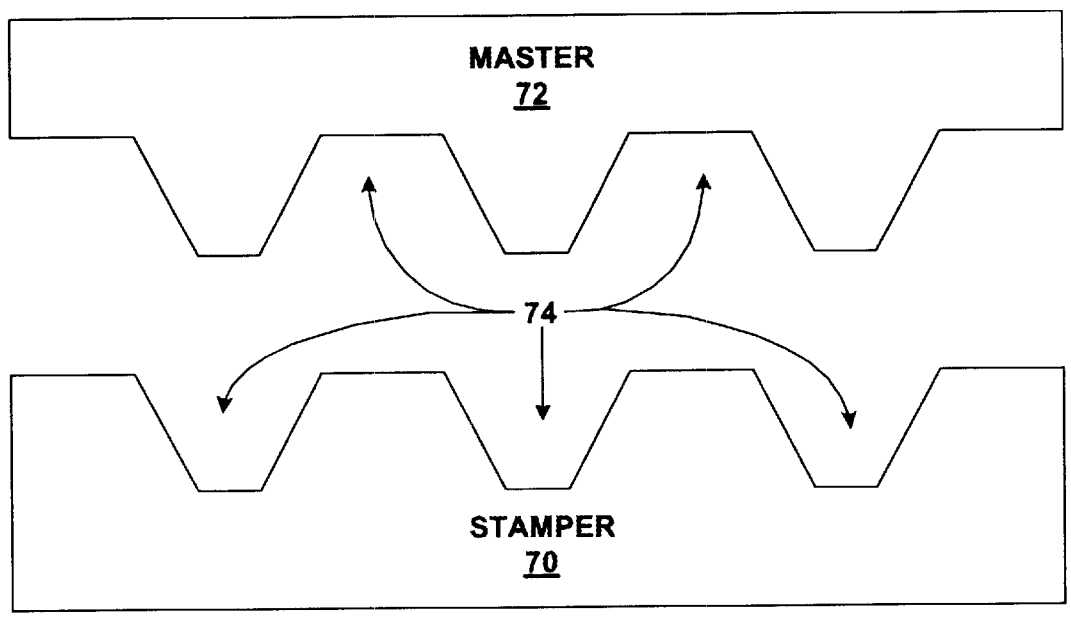
FIG. 7 is an enlarged cross sectional view of a small portion of a stamper region of an exemplary stamper created from a master.

After creating a master, the master may be used to create a stamper or a family of stampers. FIG. 7 is an enlarged cross sectional view of a small portion of a stamper region of an exemplary stamper 70 created from an information region of master 72. Master 72 includes a number of distinct information regions, and thus stamper 70 includes a number of distinct stamper regions. The distinct stamper regions on the stamper and information regions on the master include a collection of grooves 74. The orientations of grooves 74 on the master relative to those on the stamper are the inverse of one another. The grooves 74 define pits and lands on the respective surface of stamper 70 and master 72. The pits and lands, for instance, may represent bits of information encoded within a distinct information region of master 72 and a distinct stamper region of stamper 70.

Figure 8:
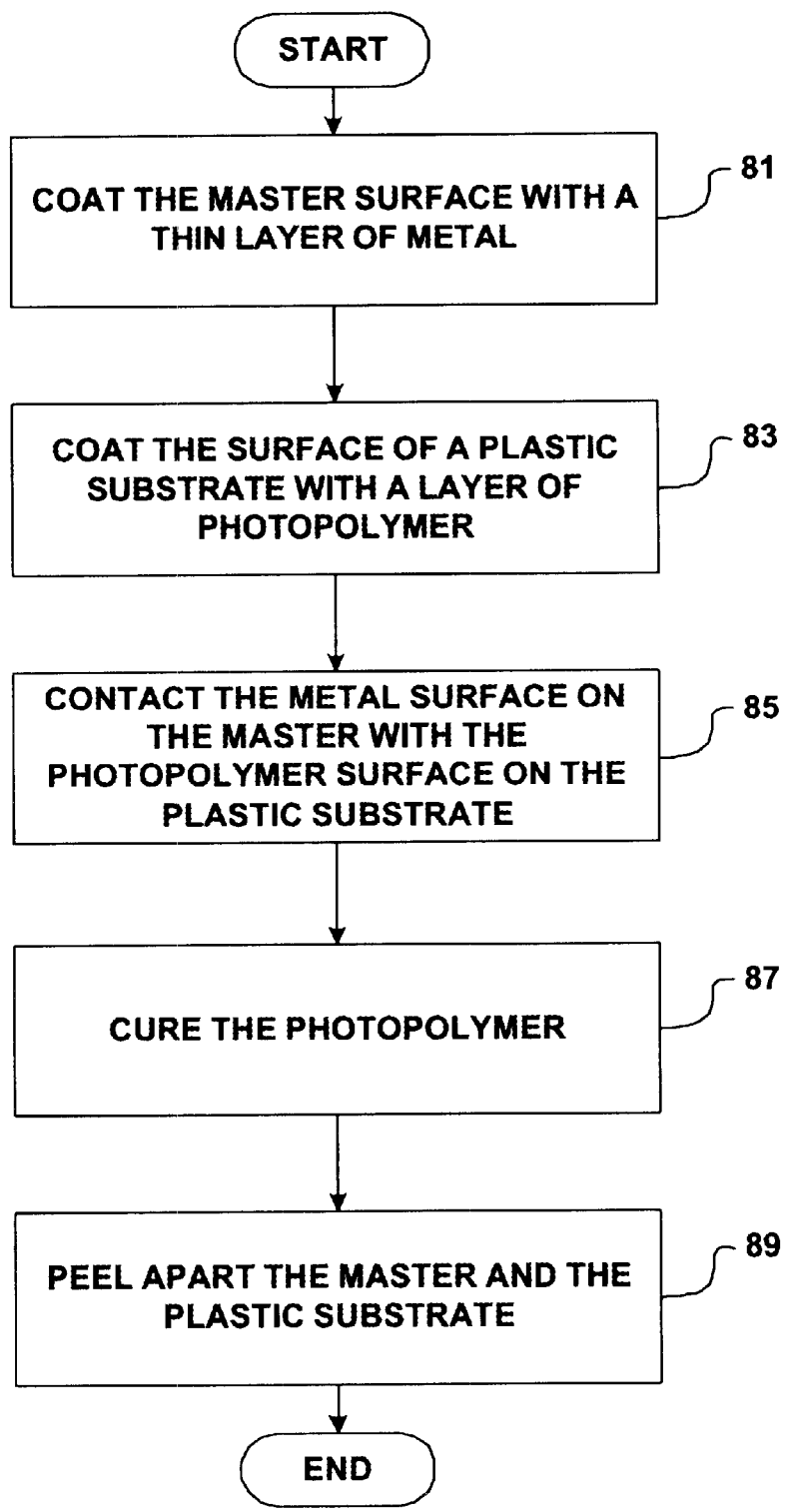
FIG. 8 is a flow diagram illustrating operations involved in creating a plastic stamper according to the invention.

There is more than one way to create a stamper, and there is more than one type of stamper that can be created. One type of stamper that can be created is a plastic stamper. FIG. 8 is a flow diagram illustrating the operations involved in creating a plastic stamper from a master. The master includes distinct information regions that create distinct stamper regions on the stamper. The master is first coated with a thin layer of metal (81), providing the master with a high quality-reflecting surface and acting as a barrier so that multiple plastic first generation stampers may be created from the master without destroying the recorded master. By way of example, the thin metal layer may comprise nickel.

Either before or after coating the master with a thin layer of metal, a plastic substrate is coated with a layer of photopolymer (83). For instance, the plastic may comprise polymethylmethacrylate (PMMA), and the "PMMA substrate" may be spin coated with the layer of photopolymer. At this point, the PMMA substrate with the layer of photopolymer is made to come in contact with the metal layer on the master (85). For example, a conventional rolling bead process may be implemented to cause the PMMA substrate with the layer of photopolymer to come in contact with the metal layer on the master.

In one particular rolling bead technique, a PMMA substrate is simultaneously coated with a layer of photopolymer (83) and made to come in contact with the metal layer on the master (85). For instance, a bead of photopolymer material can be placed just beyond a contact line of the master and the PMMA substrate. A roller then rolls over the master, creating a layer of photopolymer on the PMMA substrate as the photopolymer comes in contact with the metal layer on the master.

The photopolymer can be cured (87) to create a PMMA stamper from the PMMA substrate and the photopolymer, such that the photopolymer includes a surface pattern that is the inverse of the surface pattern on the master. Again, because the master is created to include distinct information regions, the stamper will include distinct stamper regions. The master and PMMA stamper may then be peeled apart (89). Peeling the PMMA stamper from the master may be non-destructive to the master.

By way of example, suitable photopolymers for use in the creation of a master or a plastic stamper, or a replica disk, for instance, include HDDA (4×6×) polyethylenically unsaturated monomer—hexanediol diacrylate, chemlink 102 (3×) monoethylenically unsaturated monomer—diethylene glycol monoethyl ether acrylate, elvacite 2043 (1×3×) organic polymer—polyethylmethacrylate, and irgacure 651 (0.1× 0.2) latent radical initiator-2,2-dimethoxy-2-phenylacetophenone. Another suitable photopolymer includes HHA (hydantoin hexacryulate) 1×, HDDA (hexanedioldiacrylate) 1×, and irgacure 651 (0.1×0.2) latent radical initiator-2,2-dimethyoxy-2-phenylacetophenone. These or other photopolymers may be used in accordance with the invention.

Figure 9:
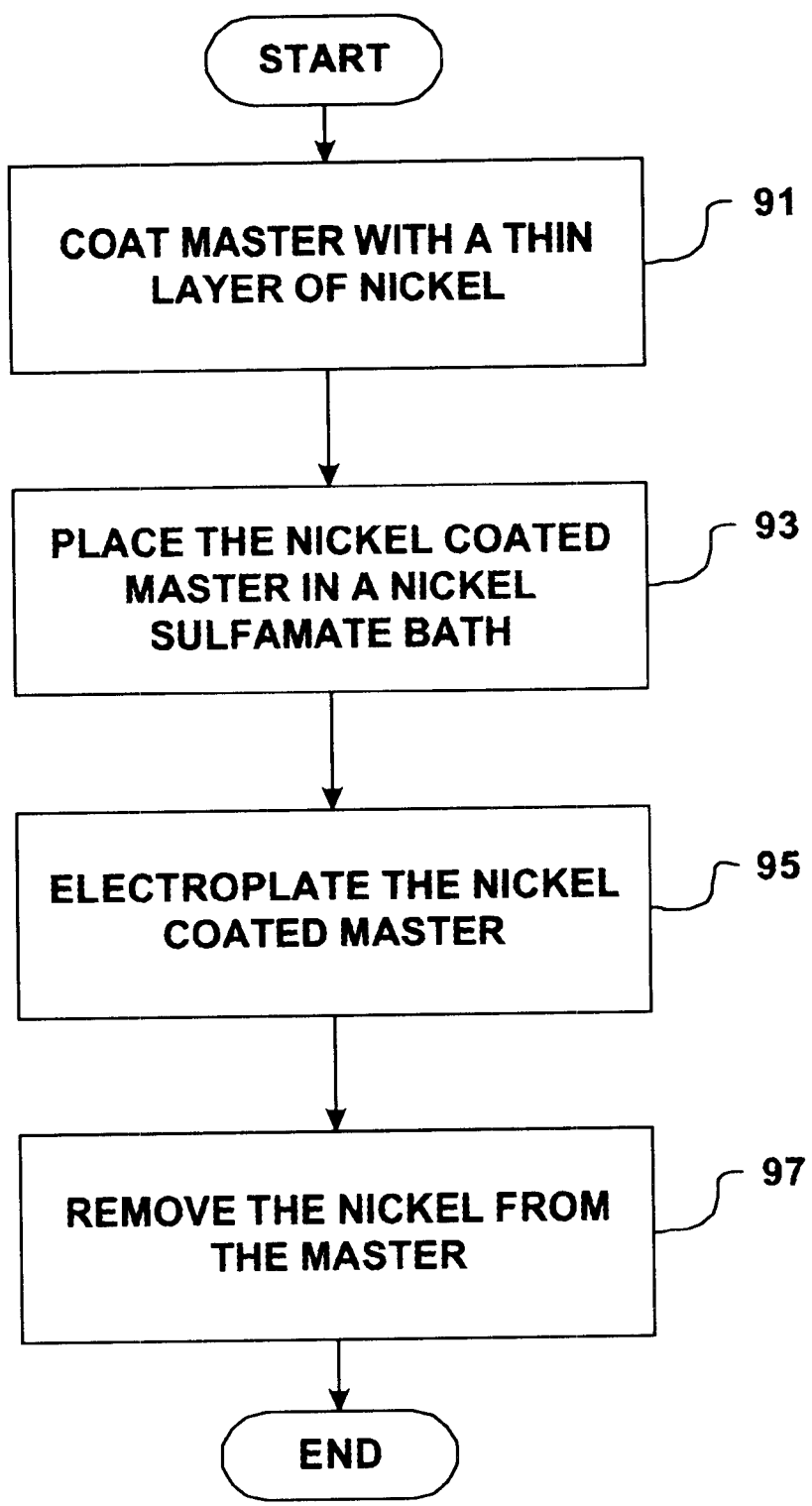
FIG. 9 illustrates a process of creating a nickel stamper according to the invention.

A metal stamper is another type of stamper that can be created. FIG. 9 illustrates a process for creating a metal stamper from a master. The process may include an electroplating process. By way of example, FIG. 9 illustrates the process of creating a nickel stamper, although other metals could be used.

As shown, a nickel stamper may be created from a master by first coating the master with a thin layer of nickel (91). Again, the master includes distinct information regions that will be passed on to the metal stamper as stamper regions. The nickel coated master can then be placed in a nickel sulfamate bath (93), where it may be electroplated (95). For instance, electroplating (95) may cause a thick layer of nickel to solidify on the nickel coated master. The thick layer of nickel may be bonded to the thin layer of nickel that was coated on the master. Thus, both layers of nickel may collectively become a metal stamper that is removed from the master (97). Removing the nickel layers from the master (97), for instance, may destroy the master. If necessary, excess photoresist may be removed from the nickel through the application of a stripper chemical.

Figure 10:
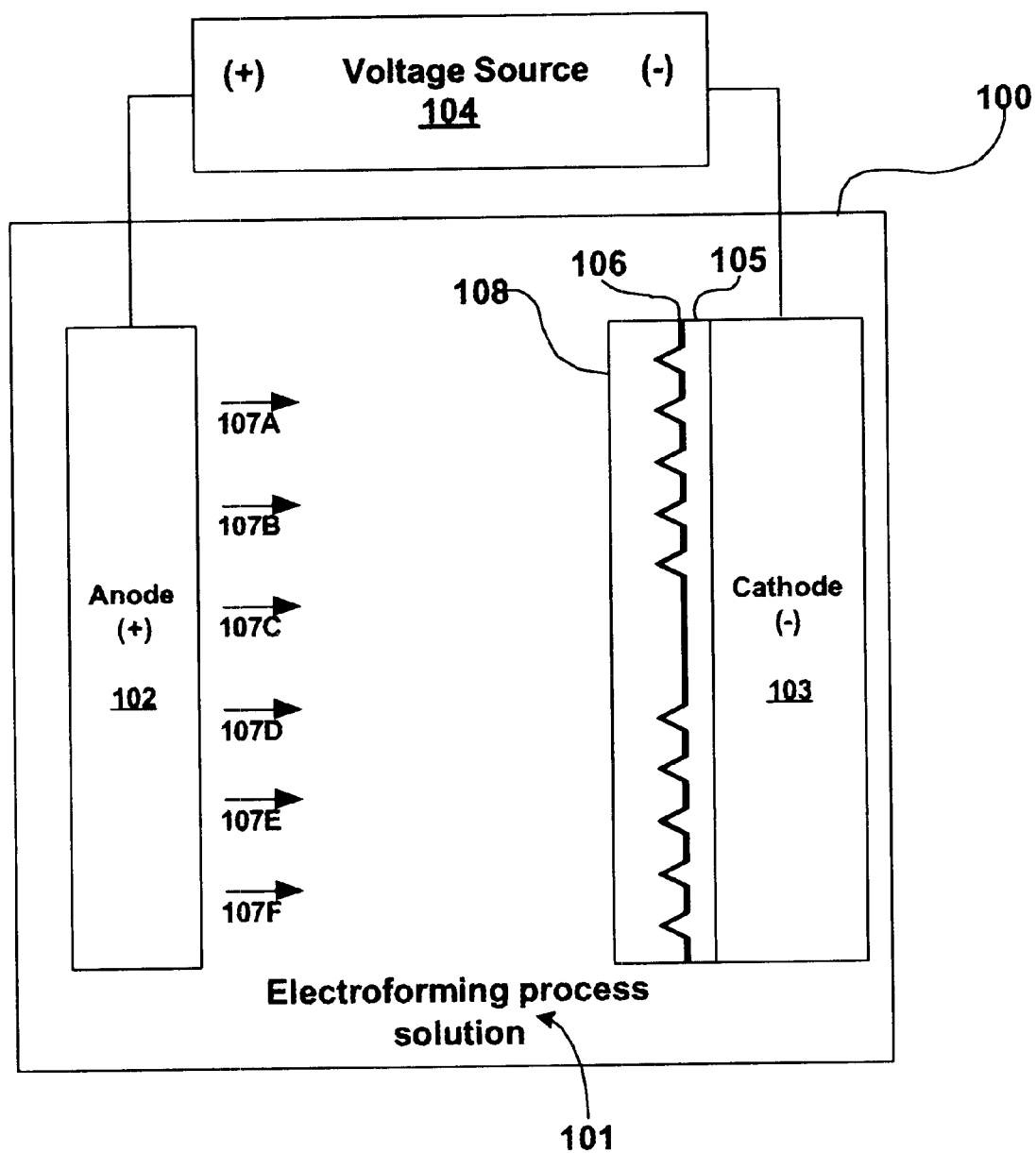
FIG. 10 is a block diagram illustrating an electroplating process in more detail.

FIG. 10 is a block diagram illustrating an electroplating process in more detail. In the exemplary embodiment shown, the electroplating process makes use of an electroforming chamber 100, an electroforming process solution 101, one or more anodes 102, one or more cathodes 103, and a voltage source 104. Voltage source 104 has a positive terminal that is electrically coupled to anode 102 and a negative terminal that is electrically coupled to cathode 103. The nickel-coated master 105 that includes distinct information regions is mechanically and electrically coupled to cathode 103, and as such, may become part of cathode 103 during the electroplating process. Cathode 103 and anode 102 are placed within electroforming chamber 100 so that they are submerged in electroforming solution 101.

For instance, anode 102 may be a nickel anode and cathode 103 may be made of copper. Electroplating process solution 101, for instance, may be a nickel sulfamate solution. A plurality of anodes in the form of nickel anode baskets, for instance, may be placed within the nickel sulfamate electroforming solution (only one anode 102 shown). In operation, cathode 103 may be rotated during the electroforming process. Voltage source 104 can be activated, and upon activation, nickel ions, indicated at 107A–107F may flow from anode 102 to cathode 103.

Everything on cathode 103 may be masked with non-metallic material, except for a thin layer of nickel coated on the master 105 (indicated at 106). During the electroplating process, a nickel structural layer 108 is uniformly plated onto the nickel coated surface 106 of master 105. The electroplating process can be started with a slow current so that nickel is uniformly built up to a desired thickness on the nickel plated surface 106, e.g., a thickness of approximately 300 microns may be desirable. When the plating process is complete, the exposed surface of the nickel structural layer 108 can be polished. During the electroplating process, the thin layer of nickel 106 originally coated on the master 105 may become part of the nickel structural layer 108 to form a metal stamper.

Figure 11:
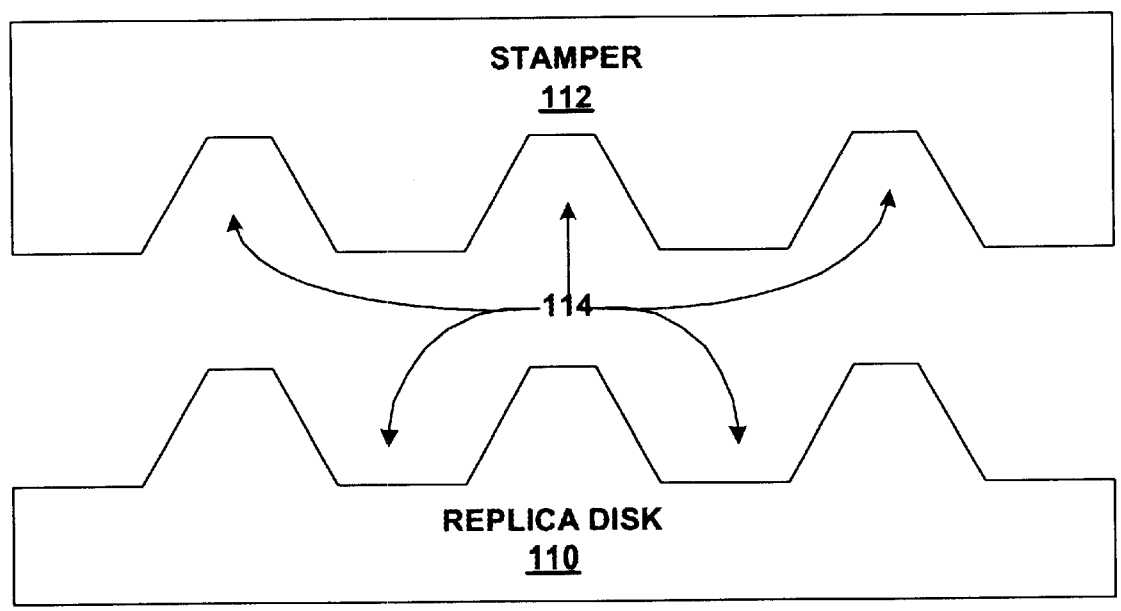
FIG. 11 is an enlarged cross-sectional view of a small portion of a replicated region of an exemplary first replica disk created from a stamper.

Once a stamper including a number of distinct stamper regions has been created from a master that includes a number of distinct information regions, the stamper can be used to stamp replica disks that include a number of distinct replicated regions. FIG. 11 is an enlarged cross sectional view of a small portion of a replicated region of an exemplary first replica disk 110 created from a stamper region of stamper 112. The stamping process involves making contact between the stamper 110 and a replica disk 112, e.g., made of polycarbonate. For instance, the stamper 110 may be pressed against a polycarbonate replica disk 112, or alternatively the stamper 110 may form part of an injection mold that is filled with a polycarbonate that cools to form replica disk 112. Either way, after making contact between the stamper 110 and replica disk 112, the stamper 110 may be peeled away from the replica disk 112, leaving an inverted image of stamper 110 on replica disk 112. This inverted image defines the number of replicated regions on replica disk 112. Each replicated region may include the desired surface pattern for smaller replica disks that can be removed from the stamped disk. Stamper regions and replicated regions may include grooves 114 that define pits and lands on the respective surface of stamper 112 and replica disk 110. The pits and lands, for instance, may represent bits of information.

In other embodiments, a stamper that includes a number of distinct stamper regions may be created from a master that includes a single information region. In that case, the same information region may be used to create the various stamper regions on the stamper. For example, during the process of creating the stamper, the master could be rotated relative to the stamper to create each stamper region. The process of creating the stamper would need to be non-destructive to the master, since the master would be reused to create the different stamper regions. The process of creating a plastic stamper described in detail above is one example of a stamper creation process that is non-destructive to the master.

Stamping dual-sided disks is even more challenging. Dual-sided replica disks are desirable because they can store more data than single-sided disks. Dual-sided replica disks may require the creation of two stampers, one corresponding to each side of the dual-sided disk. The two stampers can both be placed in a dual-sided stamping tool, which is then used to stamp dual-sided disks.

Figure 12:
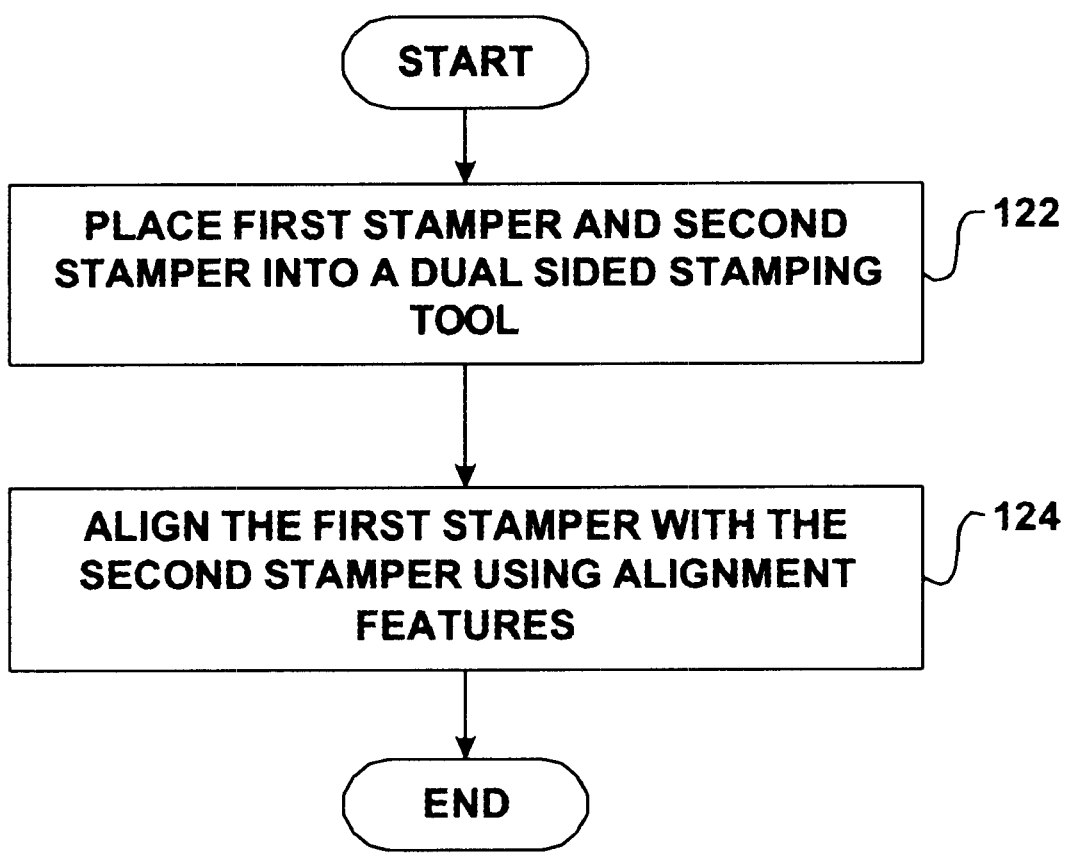
FIG. 12 is a flow diagram illustrating a stamping technique for stamping dual-sided replica disks that include a number of distinct replicated regions.

Dual-sided disks that include a number of replicated regions, i.e., first disks, can be especially challenging to create because the two stampers must be precisely aligned in the dual-sided stamping tool. In other words, the distinct stamper regions of the first stamper must be aligned with the distinct stamper regions of the second stamper. FIG. 12 is a flow diagram illustrating a stamping technique for stamping dual-sided replica disks that include a number of distinct replicated regions. As shown, a first stamper and a second stamper are both placed in a dual-sided stamping tool (122). For example, the dual-sided stamping tool may be an injection mold capable of receiving two stampers within a mold cavity. The first stamper defines the top surface of a replica disk and the second stamper defines the bottom surface of the replica disk.

Once the first and second stampers have been placed in the dual-sided stamping tool (122), they can be aligned using alignment features created on the stampers (124). For example, the stampers may be created to include alignment marks that can be used to determine whether the stampers are properly aligned. In addition, one of the stampers may be created to include an alignment notch to fine tune the alignment between the two stampers. For example, the first stamper may be inserted into the dual-sided stamping tool in a fixed position, and the second stamper can be inserted into the dual-sided stamping tool such that an alignment mark on the second stamper is aligned with that of the second stamper. An alignment notch on the second stamper can be engaged with a fine tune adjustment mechanism on the dual-sided stamping tool. The fine tune adjustment mechanism, then, can be used to rotate the position of the second stamper relative to that of the first stamper to ensure that the two stampers are precisely aligned within the dual-sided stamping tool.

Figure 13:
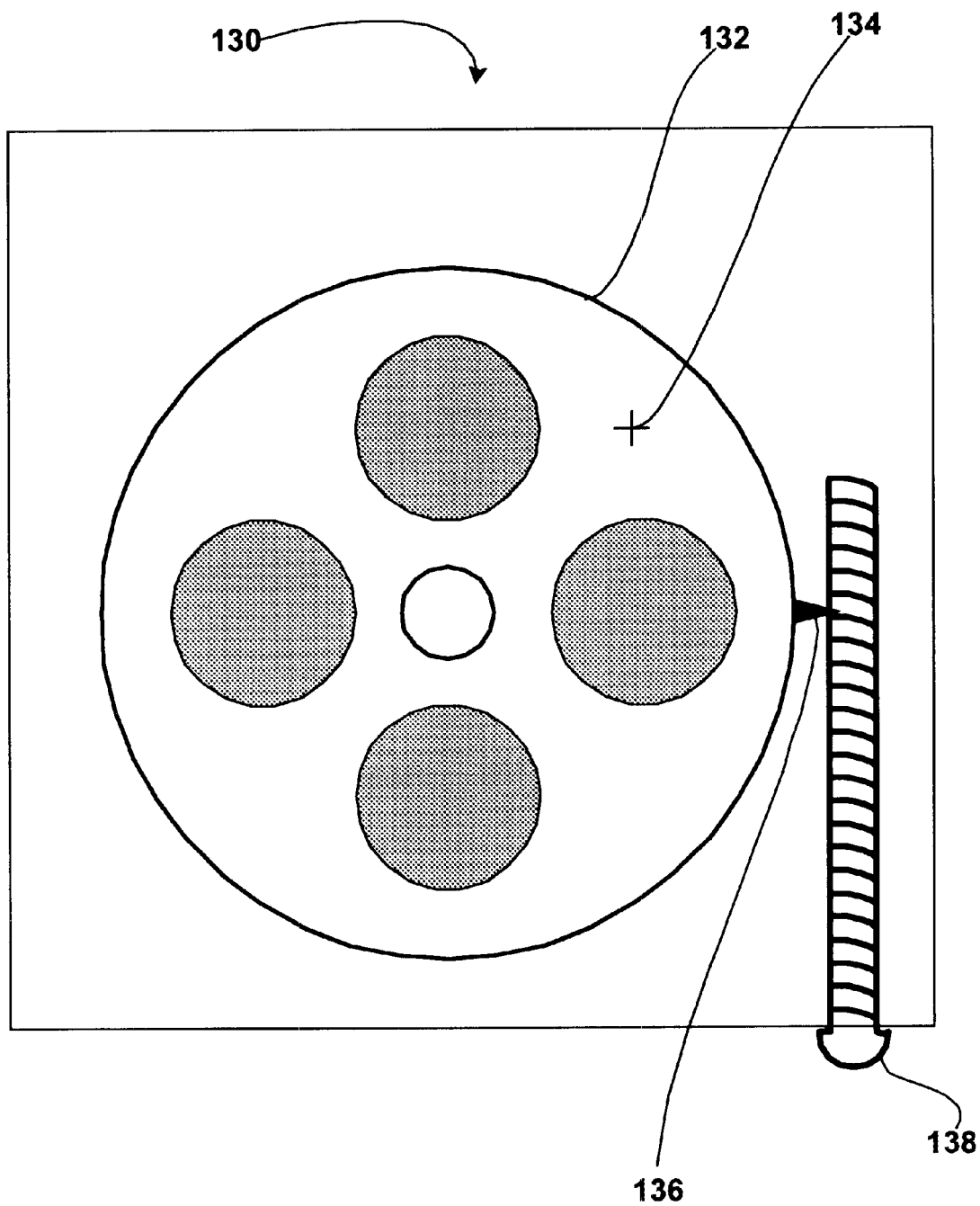
FIG. 13 is a top view of one half of a dual-sided stamping tool that includes a stamper according to the invention.

FIG. 13 is a top view of one half of a dual-sided stamping tool that includes a stamper according to the invention. For example, FIG. 13 may correspond to the top-half or the bottom-half of a dual-sided stamping tool such as a dual-sided injection mold. Stamper 132 is inserted in dual-sided stamping tool 130. Stamper 132 includes alignment mark 134, that can be aligned with a similar mark on the other stamper (not shown) in dual-sided stamping tool 130. Alignment mark 134 may have any shape, and can be etched into a master that is used to create stamper 132.

Stamper 132 may also include an alignment notch 136 to facilitate even more precise alignment. Alignment notch 136 may engage a fine tune adjustment mechanism 138, such as a fine threaded micro-adjustment jack screw or the like. Fine tune adjustment mechanism 138 may be used to rotate stamper 132 within the dual-sided stamping tool 130. Fine tune adjustment mechanism 138 may be used to align stamper 132 with the other stamper (not shown) in the dual-sided stamping tool to accuracy within 10 microns or less.

After inserting the two stampers into the dual-sided stamping tool, and aligning the stampers, a first replica disk can be created to include a number of dual-sided replicated regions. The first disk can then be tested to determine whether the replicated regions are properly aligned. If not, the fine tune adjustment mechanism 138 can be used to rotate stamper 132 within the dual-sided stamping tool 130, and another first replica disk can be created. Once, the replicated regions of a first disk are properly aligned, the dual-sided stamping tool can be used to mass produce dual-sided first replica disks that include dual-sided replicated regions. The dual-sided replicated regions can then be removed from the first replica disks to define dual-sided second disks. The dual-sided second disks may be used as information storing disks, or alternatively, the dual-sided second disks may be inserted into a cartridge, or the like, for use as a data storage cartridge.

Various embodiments of the invention have been described. For instance, techniques for creating optical data storage disks have been described. The techniques can be used to more efficiently create optical data storage disks. For example, each stamping process according to the invention can realize a number of optical data storage disks. Moreover, the invention can be particularly advantageous in providing a way to efficiently create smaller optical data storage disks from existing machines and processes. In particular, existing machines that were created to fabricate either 120 millimeter diameter disks or 130 millimeter diameter disks could be utilized in the fabrication process of 32 millimeter disks.

Nevertheless, various modifications may be made without departing from the scope of the invention. For example, the invention could be modified to facilitate the creation of optical data storage disks having any particular diameter. In addition, the invention could be modified to create replicated regions having other shapes. In that case, a data storage medium may have a shape corresponding to the shape of the replicated region. Accordingly, other embodiments are within the scope of the following claims.

What is claimed is:

1. A method comprising:
    creating a master having distinct information regions etched upon a surface, wherein creating the master includes coating a master glass with a photoresist, placing the master glass in a master glass carrier, wherein the center of the master glass is offset from the center of the master glass carrier, exposing the photoresist to a laser to define one of the distinct information regions, rotating the master glass relative to the master glass carrier, exposing the photoresist to the laser to define another one of the distinct information regions, and developing the photoresist;
    creating a stamper from the master;
    stamping a first disk with the stamper, the first disk including replicated regions in locations substantially corresponding to locations of the distinct information regions on the master; and
    separating the replicated regions from the first disk to create a number of second disks from the first disk.

2. The method of claim 1, further comprising creating the master to have multiple distinct information regions etched upon the surface in an evenly spaced arrangement, wherein the distance between the center of the master and the centers of the distinct information regions is substantially equal.

3. The method of claim 1, wherein separating the replicated regions comprises die punching the replicated regions from the first disk.

4. The method of claim 1, wherein separating the replicated regions comprises laser cutting the replicated regions from the first disk.

5. The method of claim 1, wherein separating the replicated regions comprises mechanically cutting the replicated regions from the first disk.

6. A method comprising:
    creating a master having distinct information regions etched upon a surface;
    creating a first stamper from the master, wherein creating the first stamper includes creating the first stamper to include an alignment mark;
    stamping a dual-sided first disk including replicated regions in locations substantially corresponding to locations of the distinct information regions on the master by placing the first stamper and a second substantially similar stamper into a dual-sided stamping tool, aligning the first stamper with the second stamper by aligning the alignment mark on the first stamper with an alignment mark on the second stamper, and stamping the dual-sided first disk using the dual-sided stamping tool; and
    separating the replicated regions from the dual-sided first disk to create a number of dual-sided second disks from the dual-sided first disk.

7. The method of claim 6, wherein creating the first stamper includes creating the first stamper to include an alignment notch on a side of the first stamper.

8. The method of claim 7, wherein aligning the first stamper with the second stamper includes adjusting the position of the first stamper relative to the second stamper by adjusting an adjustment mechanism on the dual-sided stamping tool, the adjustment mechanism being engaged with the alignment notch on the side of the first stamper.

9. A method comprising:
    coating a master glass with a photoresist;
    offset placing the master glass in a master glass carrier, wherein the center of the master glass is offset from the center of the master glass carrier;
    exposing the photoresist to a laser to define a first distinct information region;
    rotating the master glass relative to the master glass carrier;
    exposing the photoresist to the laser to define a second distinct information region; and
    developing the photoresist.

10. The method of claim 9, further comprising:
    further rotating the master glass relative to the master glass carrier;
    exposing the photoresist to the laser to define a third distinct information region;
    further rotating the master glass relative to the master glass carrier; and exposing the photoresist to the laser to define a fourth distinct information region.

11. The method of claim 9, wherein the master glass is circular-shaped.

12. The method of claim 9, wherein the master glass assumes a multi-sided geometric shape.

13. The method of claim 12, wherein the multi-sided geometric shape comprises a shape selected from the group consisting of: a triangle, a square, a pentagon, a hexagon and an octagon.

* * * * *